(12) United States Patent
Shin

(10) Patent No.: US 10,815,923 B1
(45) Date of Patent: Oct. 27, 2020

(54) OXYGEN CONCENTRATION-BASED EXHAUST GAS RECIRCULATION FLOW RATE COMPENSATION CONTROL METHOD AND ENGINE SYSTEM

(71) Applicants: Hyundai Motor Company, Seoul (KR); Kia Motors Corporation, Seoul (KR)

(72) Inventor: Buom-sik Shin, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/688,691

(22) Filed: Nov. 19, 2019

(30) Foreign Application Priority Data

Jun. 25, 2019 (KR) .................. 10-2019-0075598

(51) Int. Cl.
*F02D 41/14* (2006.01)
*F02D 41/00* (2006.01)

(52) U.S. Cl.
CPC ..... *F02D 41/1458* (2013.01); *F02D 41/0052* (2013.01); *F02D 41/0072* (2013.01); *F02D 41/0077* (2013.01); *F02D 41/1454* (2013.01)

(58) Field of Classification Search
CPC ............. F02D 41/1458; F02D 41/0077; F02D 41/0052; F02D 41/1454; F02D 41/0072
USPC ................... 701/108; 123/673, 568.11, 672
See application file for complete search history.

(56) References Cited

U.S. PATENT DOCUMENTS

| 7,117,078 | B1* | 10/2006 | Gangopadhyay ... F02D 41/1454 |
| | | | 701/103 |
| 9,371,781 | B2* | 6/2016 | Schnorbus .......... F02D 41/0047 |
| 2011/0184632 | A1 | 7/2011 | Kang et al. |
| 2012/0253644 | A1 | 10/2012 | Port |
| 2013/0192569 | A1 | 8/2013 | Seiberlich |
| 2017/0152806 | A1* | 6/2017 | Mischler ............. F02D 41/0295 |
| 2019/0368448 | A1* | 12/2019 | Arakawa ............. F02D 41/0072 |

FOREIGN PATENT DOCUMENTS

| DE | 102012004556 A1 | 9/2013 |
| KR | 10-2008-0032730 A | 4/2008 |

* cited by examiner

*Primary Examiner* — Mahmoud Gimie
(74) *Attorney, Agent, or Firm* — Mintz Levin Cohn Ferris Glovsky and Popeo, P.C.; Peter F. Corless

(57) ABSTRACT

An oxygen concentration-based exhaust gas recirculation (EGR) flow rate compensation control method may include a model compensation mode, which confirms engine information acquired from an engine system, calculates an intake oxygen concentration by a model intake oxygen mass ratio through a combination of an intake oxygen mass ratio model value and a model exhaust lambda value and an indirect intake oxygen mass ratio through a combination of the intake oxygen mass ratio model value and an exhaust-side measurement lambda value, respectively, and compensates the model intake oxygen mass ratio as a model intake oxygen mass ratio compensation value applying a compensation error relative to the indirect intake oxygen mass ratio by using the model intake oxygen mass ratio as a model intake oxygen mass ratio current value, by a controller.

19 Claims, 7 Drawing Sheets

OXYGEN CONCENTRATION-BASED EXHAUST GAS RECIRCULATION FLOW RATE COMPENSATION CONTROL METHOD AND ENGINE SYSTEM

CROSS-REFERENCE TO RELATED APPLICATION

This application claims under 35 U.S.C. § 119(a) the benefit of Korean Patent Application No. 10-2019-0075598, filed on Jun. 25, 2019, the entire contents of which are incorporated by reference herein.

BACKGROUND

(a) Technical Field

The present disclosure relates to exhaust gas recirculation (EGR) flow rate control, more particularly, to an engine system that performs oxygen concentration-based EGR flow rate compensation control using an exhaust-side lambda sensor measurement value without applying an oxygen sensor (or lambda sensor) to an intake system, thereby improving an NOx reduction effect.

(b) Description of the Related Art

Generally, exhaust gas recirculation (EGR)-based oxygen concentration control, etc. is an example of technology for reducing pollution regulation material applied to a vehicle in order to reduce NOx/CO/HC.

Particularly, the EGR-based oxygen concentration control is a method of using an exhaust gas recirculation system to which an EGR line installing a turbo charger, an EGR valve, and an EGR cooler is connected to an intake manifold so as to lower a combustion maximum temperature with a low oxygen content while lowering the rate of temperature rise as compared to the same combustion by mixing some of exhaust gases among the exhaust gases of an engine with an intake air by the EGR gas.

Therefore, the NOx reduction effect by the EGR-based oxygen concentration control may allow a gasoline vehicle and a diesel vehicle to meet exhaust gas and environmental regulations.

Further, the diesel vehicle particularly combines a catalytic-based reduction control and a lambda (λ)-based full combustion control with the EGR-based oxygen concentration control or carries out them side by side, thereby further improving CO/HC as well as NOx reduction effects.

For example, the catalyst-based reduction control is a method of using precious metals (e.g., Pt/Rh, Pd/Rh, Pt/Pd/Rh) such as a Diesel Oxidation Catalyst (DOC), a Catalyzed Particulate Filter (CPF), a Selective Catalyst Reduction (SCR), and a Three Way Catalyst (TWC) mounted one or more in the exhaust system for NOx reduction. In addition, the lambda-based full combustion control is a method of using an air amount sensor of the intake system and the lambda sensor (or oxygen sensor) of the exhaust system for the lambda (λ) that is the excess air ratio (a ratio of the air amount necessary for fully combusting fuel and the air amount actually supplied) at which a theoretical air-to-fuel ratio at which fuel is fully combusted theoretically becomes 1.

However, the EGR-based oxygen concentration control inevitably has difficulty in being combined with more advanced technology capable of reducing the NOx generated in the combustion process through an EGR due to the limit of exhaust gas reduction by the 3-way catalyst such as lean combustion by being based on a certain degree of the discharge gas flow rate.

In addition, the measurement of the EGR gas flow rate, which can suppress generation of NOx by reducing the oxygen concentration in the combustion process, also applies an indirect measurement method of using for the EGR gas flow rate control the intake-side air amount based on the sensor measurement value of an air flow rate sensor, etc. together with an air amount variation model unit based on the relationship formula in which the EGR gas flow rate increases as much as the reduction in a fresh air amount (i.e., intake air amount), instead of applying a direct measurement method of the EGR gas flow rate due to the high cost aspect, thereby inevitably adding the difficulty in being combined with the technology of reducing the NOx generated in the combustion process through the EGR.

Particularly, recently enhanced exhaust gas and environmental regulations require the direct method of performing the oxygen concentration adjustment through the EGR control based on oxygen concentration measured by mounting an oxygen sensor (i.e., lambda sensor) on the intake manifold rather than the indirect method in order to enhance the NOx reduction effect.

However, the direct method using the oxygen sensor (or lambda sensor) should be able to overcome the technical limitation as follows.

First, the use of the oxygen sensor (or lambda sensor) should be able to overcome the intake manifold mounting condition that causes a theoretical problem of partially increasing the ambient temperature of the intake system by operation of the sensor unlike the exhaust system mounting condition, because it makes knocking weaken in the gasoline engine and also increasingly generates NOx due to the increase in temperature in the diesel engine.

Second, the use of the oxygen sensor (or lambda sensor) may prevent ceramic component breakage of the sensor, due to a difference in temperature caused by a large amount of water vapor or water contained in the EGR gas in the relatively low-temperature intake manifold condition can break the ceramic component of the sensor.

Third, the use of the oxygen sensor (or lambda sensor) is costly, which may reduce product competitiveness due to the increase in cost.

The contents described in Description of Related Art are to help the understanding of the background of the present disclosure, and can include what is not previously known to those skilled in the art to which the present disclosure pertains.

SUMMARY

Therefore, an object of the present disclosure is to provide an oxygen concentration-based exhaust gas recirculation (EGR) flow rate compensation control method and an engine system, which can calculate the oxygen concentration to the intake air amount supplied to a combustion chamber with an oxygen concentration calculation model using an exhaust lambda measurement value, thereby reducing the NOx generated in the combustion process through the EGR flow rate control without directly using an oxygen sensor (or lambda sensor), so as to improve the NOx reduction effect for satisfying the enhanced exhaust gas and environmental regulations without various technical difficulties such as settlement of an intake manifold mounting condition.

An oxygen concentration-based EGR flow rate compensation control method of the present disclosure for achieving the object includes a model compensation mode, which confirms engine information acquired from an engine system, calculates an intake oxygen concentration by a model intake oxygen mass ratio through a combination of an intake oxygen mass ratio model value and a model exhaust lambda value and an indirect intake oxygen mass ratio through a combination of the intake oxygen mass ratio model value and an exhaust-side measurement lambda value, respectively, and compensates the model intake oxygen mass ratio as a model intake oxygen mass ratio compensation value applying a compensation error relative to the indirect intake oxygen mass ratio by using the model intake oxygen mass ratio as a model intake oxygen mass ratio $_{current}$ value, by a controller.

As a preferred embodiment, the model intake oxygen mass ratio is calculated by applying a fresh air amount, a fresh air temperature, an intake air pressure, an engine RPM, and filling efficiency among the engine information to an intake oxygen concentration model.

As a preferred embodiment, the model compensation mode is performed by calculating the intake oxygen concentration that calculates the indirect intake oxygen mass ratio and the model intake oxygen mass ratio, respectively, verifying the model intake oxygen mass ratio that calculates the compensation error by the error verification for the model intake oxygen mass ratio current value, and compensating the model intake oxygen mass ratio that applies the compensation error to the model intake oxygen mass ratio current value to be generated as the model intake oxygen mass ratio $_{compensation}$ value.

As a preferred embodiment, the calculating the intake oxygen concentration, the verifying the model intake oxygen mass ratio, and the compensating the model intake oxygen mass ratio are performed through an intake oxygen concentration model unit connected with the controller.

As a preferred embodiment, the error verification is calculated by a momentary error rate of the model intake oxygen mass ratio with respect to the indirect intake oxygen mass ratio, and the compensation error is calculated by the momentary error rate. The momentary error rate is calculated by a time differential for a difference value between the intake oxygen mass ratio and the model intake oxygen mass ratio, while the compensation error is calculated by applying an error learning adjustment speed factor to a momentary error rate integral value that time-integrates the momentary error rate.

As a preferred embodiment, the model intake oxygen mass ratio compensation value is calculated by summing the compensation error and the model intake oxygen mass ratio current value.

As a preferred embodiment, the model intake oxygen mass ratio is calculated from an intake manifold oxygen concentration applying an intake flow rate oxygen mass ratio, an EGR rate, an intake flow rate oxygen concentration, an exhaust gas oxygen ratio, a theoretical air-to-fuel ratio, a lambda value, an EGR gas oxygen concentration, and an intake flow rate oxygen concentration.

As a preferred embodiment, the model application mode controlling the EGR system by the controller is performed by the model intake oxygen mass ratio compensation value. The model application mode is performed by determining whether to carry out an EGR flow rate compensation control, outputting the model intake oxygen mass ratio compensation value to the EGR system, and performing the compensation control of the EGR flow rate mixed with a fresh air through the EGR system.

As a preferred embodiment, when the EGR flow rate compensation control is not carried out, the model intake oxygen mass ratio compensation value is provided for updating the intake oxygen concentration model unit connected with the controller.

Then, an engine system of the present disclosure for achieving the object includes a controller configured to control an intake oxygen concentration based on engine information acquired by operating an engine by applying an indirect intake oxygen mass ratio calculated by a combination of an intake oxygen mass ratio model value and an exhaust-side measurement lambda value to a model intake oxygen mass ratio calculated by a combination of the intake oxygen mass ratio model value and a model exhaust lambda value, and outputting by compensating the model intake oxygen mass ratio as a model intake oxygen mass ratio compensation value applying a compensation error relative to the indirect intake oxygen mass ratio; and an EGR system configure to use the model intake oxygen mass ratio compensation value for an EGR valve opening control for an EGR flow rate compensation control of an EGR gas flow rate comprised in the intake air supplied to a combustion chamber of an engine.

As a preferred embodiment, the controller is connected with an intake oxygen concentration model unit for calculating the model intake oxygen mass ratio and the model intake oxygen mass ratio compensation value.

As a preferred embodiment, the intake oxygen concentration model unit calculates the model intake oxygen mass ratio by using the engine information received from the controller. The intake oxygen concentration model unit includes a data processor for reading the engine information, a model intake oxygen processor for calculating a value of the model intake oxygen mass ratio with the model intake oxygen mass ratio compensation value, and a control value output processor for outputting the model intake oxygen mass ratio compensation value to the controller.

As a preferred embodiment, the model intake oxygen processor includes a model intake oxygen calculator for calculating a momentary error rate for the value of the model intake oxygen mass ratio with the value of the indirect intake oxygen mass ratio, a model intake oxygen verifier for calculating the compensation error by using the momentary error rate, and a model intake oxygen compensator for calculating the model intake oxygen mass ratio compensation value with the compensation error.

As a preferred embodiment, the controller is connected with an intake air amount variation model unit for calculating the indirect intake oxygen mass ratio.

In the engine system of the present disclosure, the EGR flow rate control for the reduction in NOx performs the oxygen concentration-based compensation control, thereby implementing the following operations and effects.

First, it is possible to perform the EGR flow rate control that reduces the NOx generated in the combustion process even by using only the existing exhaust-side lambda sensor without applying the oxygen sensor (or lambda sensor) to the intake system. Second, it is possible to solve the application of the intake oxygen concentration useful for the direct control because of having the high correlation with the generation of the NOx exhaust gas by the oxygen concentration calculation model, thereby solving the problem according to the mounting of the intake manifold of the oxygen sensor (or lambda sensor) and the occurrence of the additional cost. Third, it is possible to use as the oxygen concentration calculation model the accurate oxygen ratio confirmed in connection with the sensor already applied to the vehicle, thereby improving the performance of the EGR flow rate compensation control. Fourthly, it is possible to reflect the changes in production distribution of the manufacturing process and the engine state of the usage process to the oxygen concentration calculation model, thereby performing the NOx exhaust gas reduction control that is a main factor of the combustion process. Fifthly, it is possible not to use the oxygen sensor (or lambda sensor) for the EGR flow rate compensation control, thereby all solving the increases in knocking of the gasoline engine and the generation of NOx of the diesel engine generated in using the sensor, the breakage of the ceramic component of the sensor, the reduction in product competitiveness due to the increase in cost, etc.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings, and since these embodiments are an example, and can be implemented in various different forms by those skilled in the art to which the present disclosure pertains, they are not limited to the embodiments described herein.

Figure 1:
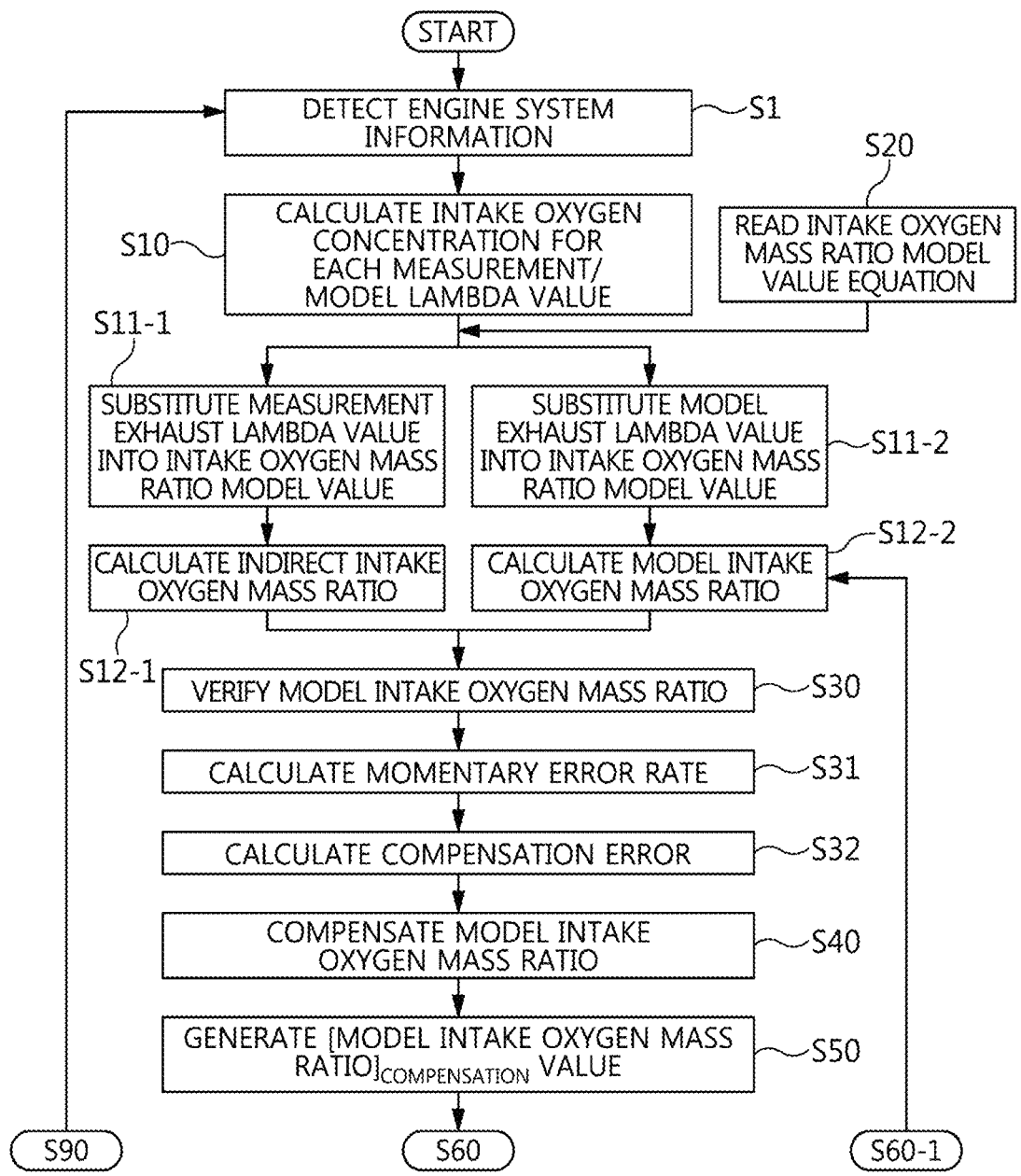
FIGS. 1 and 2 are a flowchart of an oxygen concentration-based EGR flow rate compensation control method according to the present disclosure.
Figure 2:
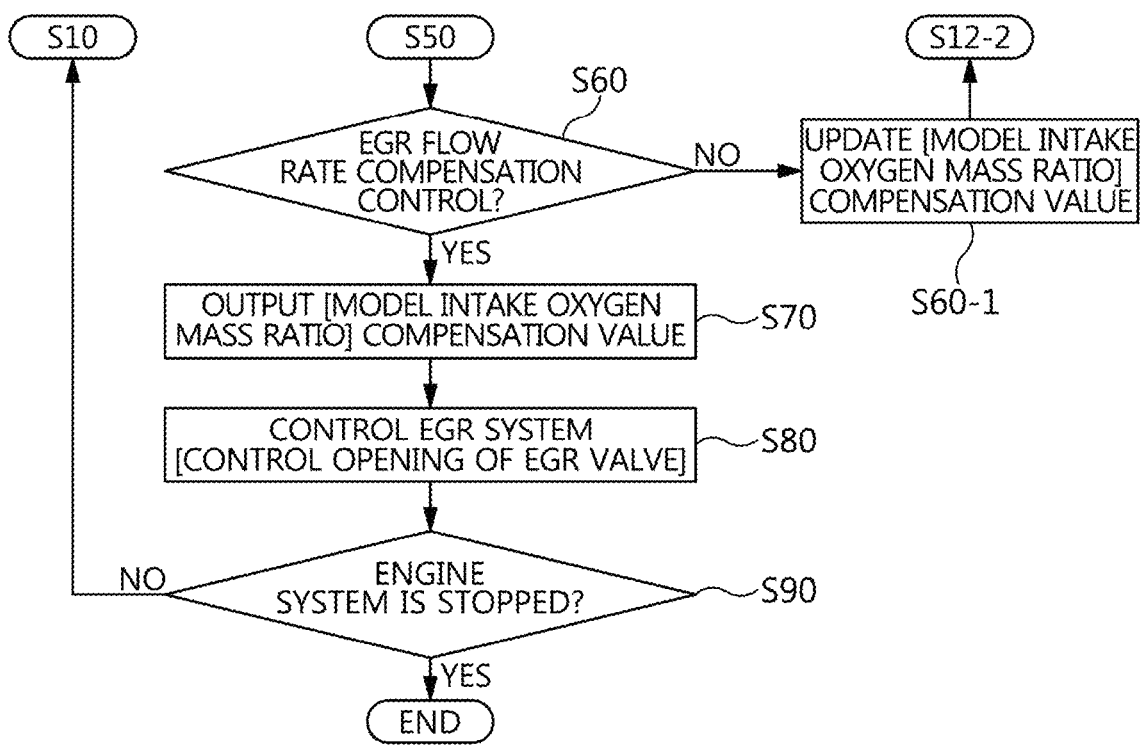

Referring to FIGS. 1 and 2, an oxygen concentration-based exhaust gas recirculation (EGR) flow rate compensation control method can convert a model intake oxygen mass ratio calculated a combination of an intake oxygen mass ratio model value relationship formula and a model exhaust lambda value into [model intake oxygen mass ratio]$_{compensation}$ value by applying a compensation error (K) relative to an indirect intake oxygen mass ratio calculated by a combination of the intake oxygen mass ratio model value relationship formula and an exhaust-side measurement lambda value in a model compensation mode (see steps S10 to S50 of FIG. 1), and then apply it to an EGR flow rate control in a model application mode (see steps S60 to S90 of FIG. 2), thereby reducing NOx generated in a combustion process even without applying an oxygen sensor (or lambda sensor) required in an intake system for accurate intake oxygen concentration.

In this case, an intake oxygen mass ratio calculated by the indirect intake oxygen mass ratio (step S12-1) is a value based on the intake oxygen mass ratio model value relationship formula (step S20) applying the measurement exhaust lambda value, and a model intake oxygen mass ratio calculated by the model intake oxygen mass ratio (step S12-2) is a value based on the intake oxygen mass ratio model value relationship formula (step S20) applying the model exhaust lambda value.

Particularly, in the model compensation mode (steps S10 to S50), calculating the intake oxygen concentration (step S10) is divided into the indirect intake oxygen mass ratio (step S12-1) and the model intake oxygen mass ratio (step S12-2), and verifying the model intake oxygen mass ratio (step S30) verifies the error of the indirect intake oxygen mass ratio (step S12-1) by momentary/compensation errors (steps S30, S31) so that the model intake oxygen mass ratio (step S12-2) is converted into the [model intake oxygen mass ratio]compensation value (steps S40, S50).

Then, the model application mode (steps S60 to S90) compensates the EGR flow rate with the [model intake oxygen mass ratio] compensation in an EGR valve opening control until an engine system is stopped.

Figure 3:
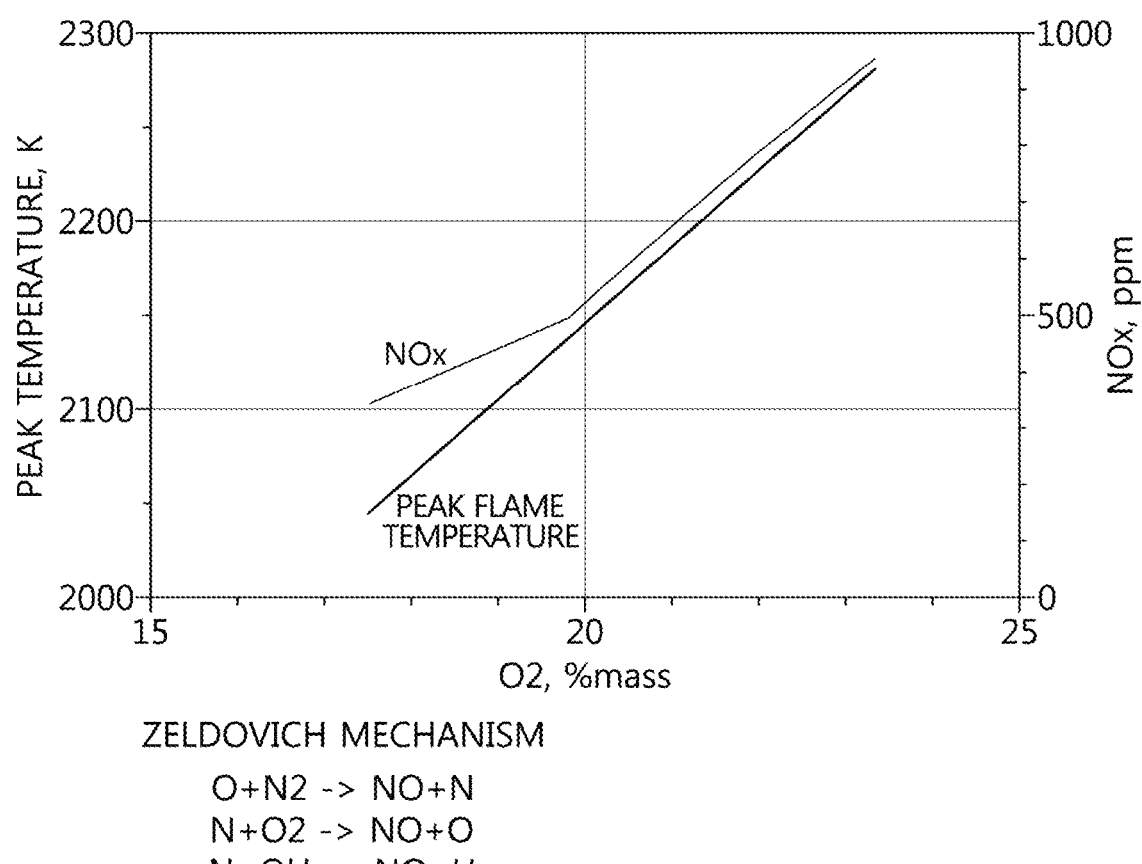
FIG. 3 is a diagram showing an example of the relationship line diagram between NOx and oxygen concentration that illustrates the effect of the oxygen concentration-based EGR flow rate compensation control according to the present disclosure.

The relationship line diagram between NOx and oxygen concentration in FIG. 3 shows an example in which the application of the [model intake oxygen mass ratio] compensation is required. As shown, the NOx greatly increases according to the oxygen reaction concentration and the higher the oxygen concentration in the combustion process, the higher the combustion gas temperature, such that the EGR flow rate control illustrates the characteristic of suppressing generation of the NOx by reducing the oxygen concentration in the combustion process. Therefore, the relationship line diagram between the NOx and the oxygen concentration illustrates and proves the necessity and the suitability for the model oxygen concentration current value compensation mode.

Therefore, the oxygen concentration-based EGR flow rate compensation control method can optimally adjust the oxygen concentration for suppressing the generation of the NOx, and particularly, have more effective characteristics for lean combustion that should reduce the NOx generated in the combustion process through the EGR due to the exhaust gas reduction limitation by the three-way catalyst.

Figure 4:
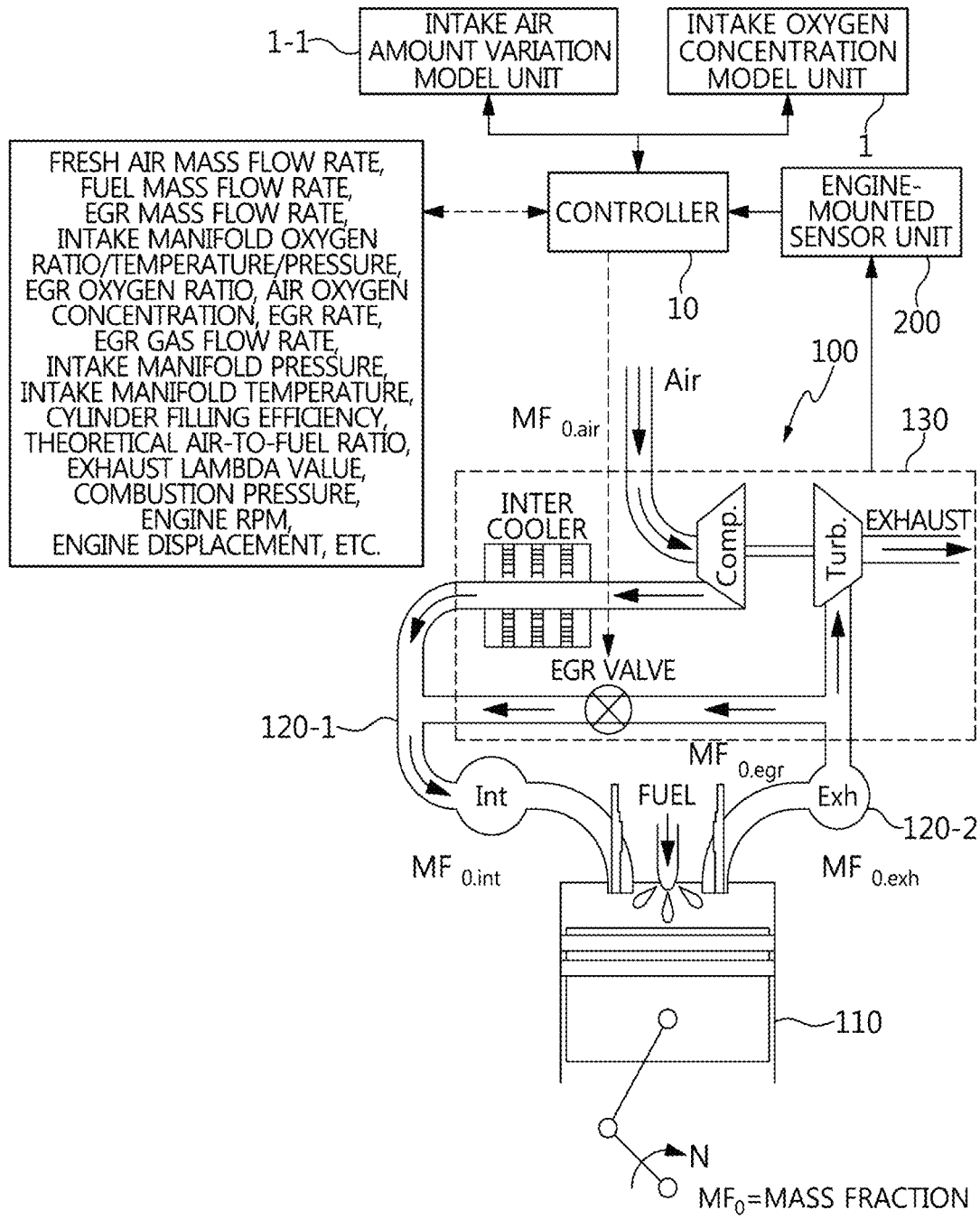
FIG. 4 is a diagram showing an example of an engine system that implements the oxygen concentration-based EGR flow rate compensation control according to the present disclosure.

Meanwhile, referring to FIG. 4, an engine system 100 includes an intake oxygen concentration model unit 1, an intake air amount variation model unit 1-1, a controller 10, an intake manifold 120-1 for supplying intake air to a combustion chamber 110 of an engine, an exhaust manifold 120-2 for exhausting the exhaust gas of the combustion chamber 110, an EGR system 130 for supplying a part of the exhaust gas to the intake air as the EGR gas, and a sensor unit 200 for detecting data of the engine in the operation state to provide it to the controller 10. In this case, the engine is high compression ratio gasoline engine and diesel engine.

Specifically, the intake oxygen concentration model unit 1 calculates a value of the model intake oxygen mass ratio (step S20-2) from the data of the sensor unit 200, and provides the calculation value to the controller 10. On the other hand, the intake air amount variation model unit 1-1 substitutes the detection values of a fresh air mass flow rate and the EGR mass flow rate among the data of the sensor unit 200 into the relationship formula in which the EGR gas is increased as much as the reduction in the fresh air amount to calculate the intake oxygen mass ratio to provide it to the controller 10 at the indirect intake oxygen mass ratio (step S20-1). Therefore, the intake air amount variation model unit 1-1 and calculation logic are the existing components.

Specifically, the controller 10 mutually communicates with each component of the engine system 100 via a Controller Area Network (CAN), and receives the calculation values of the intake oxygen concentration model unit 1 and the intake air amount variation model unit 1-1 while mutually sharing the data of the sensor unit 200 with the intake oxygen concentration model unit 1 and the intake air amount variation model unit 1-1 through its built-in logic (or program). Therefore, the controller 10 outputs the [model intake oxygen mass ratio] compensation (step S70) calculated and provided by the intake oxygen concentration model unit 1 to apply it to the EGR valve opening control of the EGR system 130.

Specifically, the intake manifold 120-1 is connected to the combustion chamber 110 to supply the fresh air and the EGR gas to the intake air, and constitutes an intake system. The exhaust manifold 120-2 sends the exhaust gas discharged from the combustion chamber 110 to an exhaust line, and constitutes an exhaust system. The EGR system 130 mixes some of the exhaust gases among the exhaust gases as the EGR gas with the fresh air of the intake manifold 120-1 to form as the intake air to be supplied to the combustion chamber 111, and is composed of an EGR valve for adjusting the EGR gas flow rate, an EGR cooler, a turbo charger, an EGR line, etc. Therefore, the intake manifold 120-1, the exhaust manifold 120-2, and the EGR system 130 are typical components of the engine system 100.

Specifically, the sensor unit 200 is engine-mounted sensors such as a Mass Air Flow (MAF) sensor for detecting an external air flow rate flowing into the intake system, and detects the engine information classified into intake data, EGR data, combustion data, and exhaust data in the operation state of the engine to provide it to the controller 10. Therefore, the sensor unit 200 is the same as the general sensor mounted on the engine system 100.

Hereinafter, the oxygen concentration-based EGR flow rate compensation control method of FIGS. 1 and 2 will be described in detail with reference to FIGS. 4 to 7. In this case, the control subject is the controller 10 connected to the intake oxygen concentration model unit 1 and the intake air amount variation model unit 1-1, and the control object is the EGR system 130 having the EGR valve. Particularly, the object to be detected is the oxygen concentrations of the fresh air (or air) and the EGR gas (or EGR) that should be calculated for adjusting the oxygen concentration within the intake air supplied to the combustion chamber 111, and the intake air is defined as a state where the fresh air (or air) and the EGR gas (or EGR) have been mixed.

First, the controller 10 performs detecting engine system information Si.

Referring to FIG. 4, the controller 10 reads the engine information detected by the engine in which the sensor unit 200 is operating to classify it into intake data, EGR data, combustion data, and exhaust data. In this case, the intake data include an air oxygen concentration, a fresh air mass flow rate, an intake manifold oxygen ratio, an intake manifold pressure, and an intake manifold temperature, the EGR data include an EGR gas mass flow rate, an EGR gas oxygen ratio, an EGR rate, and an EGR gas flow rate, the combustion data include a fuel mass flow rate, a cylinder filling efficiency, a theoretical air-to-fuel ratio, a combustion pressure, and an engine RPM, and the exhaust data include an exhaust lambda value and an engine displacement.

Particularly, the controller 10 sets as a basic value the air oxygen concentration, the fresh air mass flow rate, the intake manifold pressure, the intake manifold temperature, the EGR gas mass flow rate, the EGR gas flow rate, the fuel mass flow rate, the theoretical air-to-fuel ratio, the combustion pressure, the engine RPM, the exhaust lambda value, the engine displacement, etc. by using the logic (or program) to calculate as a calculation value the intake manifold oxygen ratio, the EGR gas oxygen ratio, the EGR rate, the cylinder filling efficiency, etc. However, the distinction between the basic value and the calculation value can be appropriately changed according to the logic (or program) of the controller 10.

Then, the controller 10 enters the model compensation mode (steps S10 to S50). The model compensation mode (steps S10 to S50) includes calculating the intake oxygen concentration (step S10), verifying the model intake oxygen mass ratio that performs the error verification by calculating the momentary error rate (step S31) and calculating the compensation error (steps S32 and S30), compensating the model intake oxygen mass ratio (step S40), and generating the [model intake oxygen mass ratio] compensation value (step S50).

Particularly, the controller 10 divides the calculating the intake oxygen concentration (step S10) into calculating the indirect intake oxygen mass ratio performed by substituting the measurement exhaust lambda value (Equation 5) into the intake oxygen mass ratio model value (Equation 8) (step S12-1), as in step S11-1 and calculating the model intake oxygen mass ratio performed by substituting the model exhaust lambda value (Equation 4) into the intake oxygen mass ratio model value (Equation 8), as in step S11-2.

Figure 5:
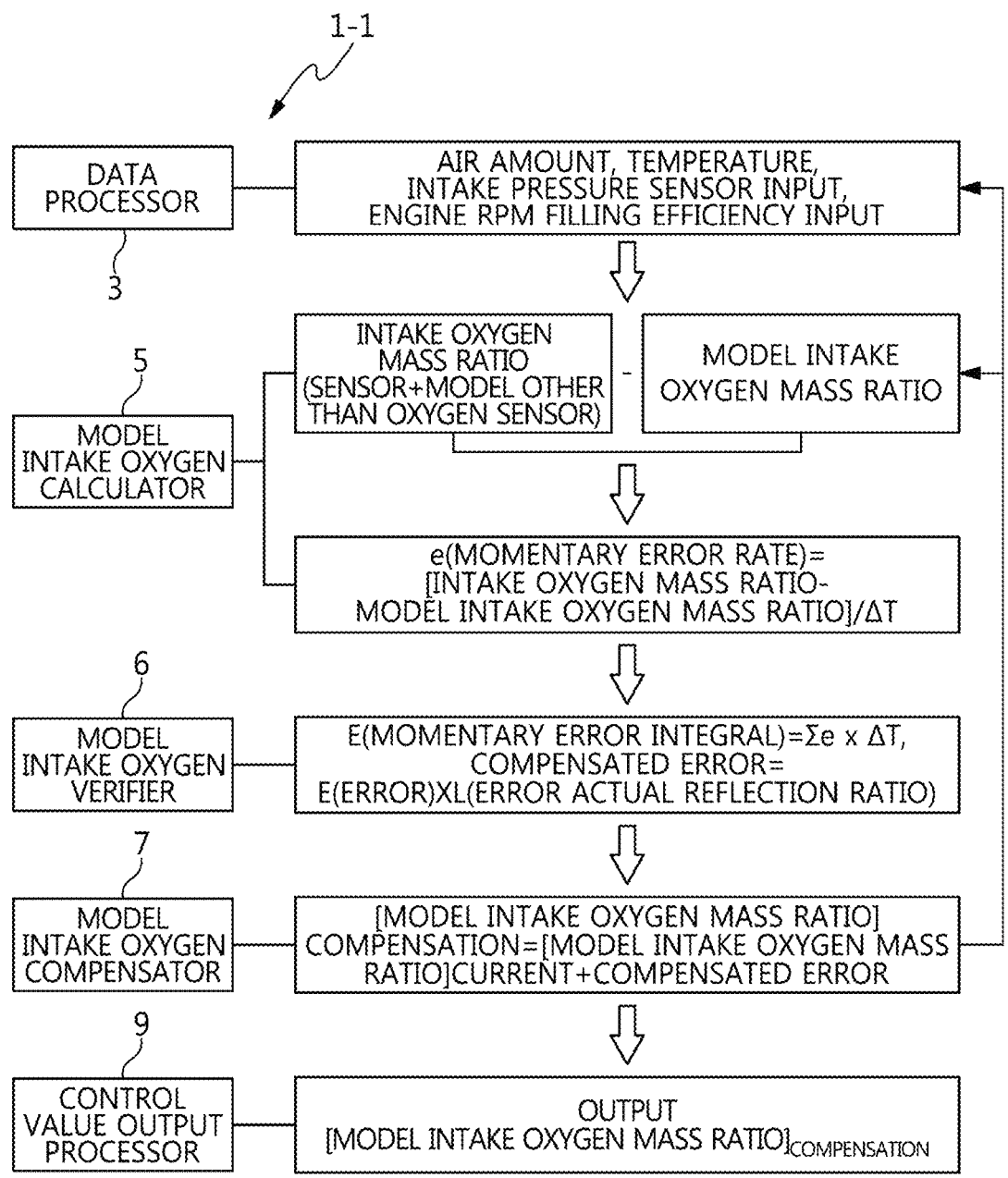
FIG. 5 is a diagram showing the operation state of an intake oxygen concentration model unit that performs a procedure of calculating a model intake oxygen mass ratio according to the present disclosure.

Referring to FIG. 5, the controller 10 is connected with the intake oxygen concentration model unit 1 that performs each step of the model compensation mode (steps S10 to S50) to receive its calculation value. For this purpose, the intake oxygen concentration model unit 1 includes a data processor 3, a model intake oxygen processor 5, 6, 7, and a control value output processor 9.

Herein, the model intake oxygen processor 5, 6, 7 is composed of a model intake oxygen calculator 5 for calculating the momentary error rate with respect to the value of the model intake oxygen mass ratio with the value of the indirect intake oxygen mass ratio, a model intake oxygen verifier 6 for calculating the compensation error by using the momentary error rate, and a model intake oxygen compensator 7 for calculating the [model intake oxygen mass ratio] compensation value with the compensation error (K).

Specifically, the data processor 3 calculates the model intake oxygen mass ratio (step S20-2) by using the data acquired by receiving the new air amount (or intake air amount), the fresh air temperature (or intake air temperature), the intake air pressure (intake air pressure sensor), the engine RPM, the filling efficiency (cylinder combustion chamber), etc. among the engine information in connection with the controller 10. A detailed procedure thereof is specified through FIG. 6.

Then, the model intake oxygen calculator 5 calculates the momentary error rate (step S31) for the value of the model intake oxygen mass ratio (step S12-2) with the value the indirect intake oxygen mass ratio (step S12-1) calculated in the intake air amount variation model unit 1-1. For this purpose, the model intake oxygen calculator 5 uses a momentary error calculation formula.

Momentary error calculation formula: $e=$[intake oxygen mass ratio−model intake oxygen mass ratio]$/\Delta T$ Herein, the "e" refers to the momentary error rate, and the "$\Delta T$" refers to a time difference calculated between two values. Therefore, the momentary error rate (e) is calculated by a time differential for the difference value between the intake oxygen mass ratio and the model intake oxygen mass ratio.

Subsequently, the model intake oxygen verifier 6 calculates the compensation error (step S32) by using the momentary error rate (e), and for this purpose, uses the compensation error calculation formula.

Compensation error calculation formula: $K=E\times L$, $E=\Sigma e\times\Delta T$ Herein, the "K" refers to the K compensation error, the "E" refers to the momentary error integral value, and the "L" refers to the error learning adjustment speed factor for the error actual reflection ratio. Therefore, the compensation error K is calculated by time-integrating the momentary error rate and multiplying it with the error learning adjustment speed factor for the error actual reflection ratio.

As a result, the compensation error K acquired in the compensation error calculation formula can be acquired as a more stable value by using the integration value with time as a reference against the distortion problem that can result from the unsafe compensation due to the momentary error, and particularly, it is possible to apply a compensation speed (L), thereby additionally acquiring a more accurate value considering the sensitivity of the system.

Thereafter, the model intake oxygen compensator 7 performs the compensating the model intake oxygen mass ratio (step S40) by using the compensation error K, and for this purpose, uses a model compensation formula.

Model compensation formula: [model intake oxygen mass ratio] compensation=[model intake oxygen mass ratio] current+compensation error (K)

Subsequently, the model intake oxygen compensator 7 generates a value of the [model intake oxygen mass ratio] compensation (step S50). In this case, the model intake oxygen compensator 7 feedbacks the value of the [model intake oxygen mass ratio] compensation to the data processor 3 and the model intake oxygen calculator 5 to be utilized in the following calculation procedure performed during operation of the engine.

Finally, the control value output processor 9 outputs the value of the [model intake oxygen mass ratio] compensation (step S50).

Then, the controller 10 receives the value of the [model intake oxygen mass ratio] compensation (step S50), thereby completing performing each step of the model compensation mode (steps S20 to S50).

Figure 6:
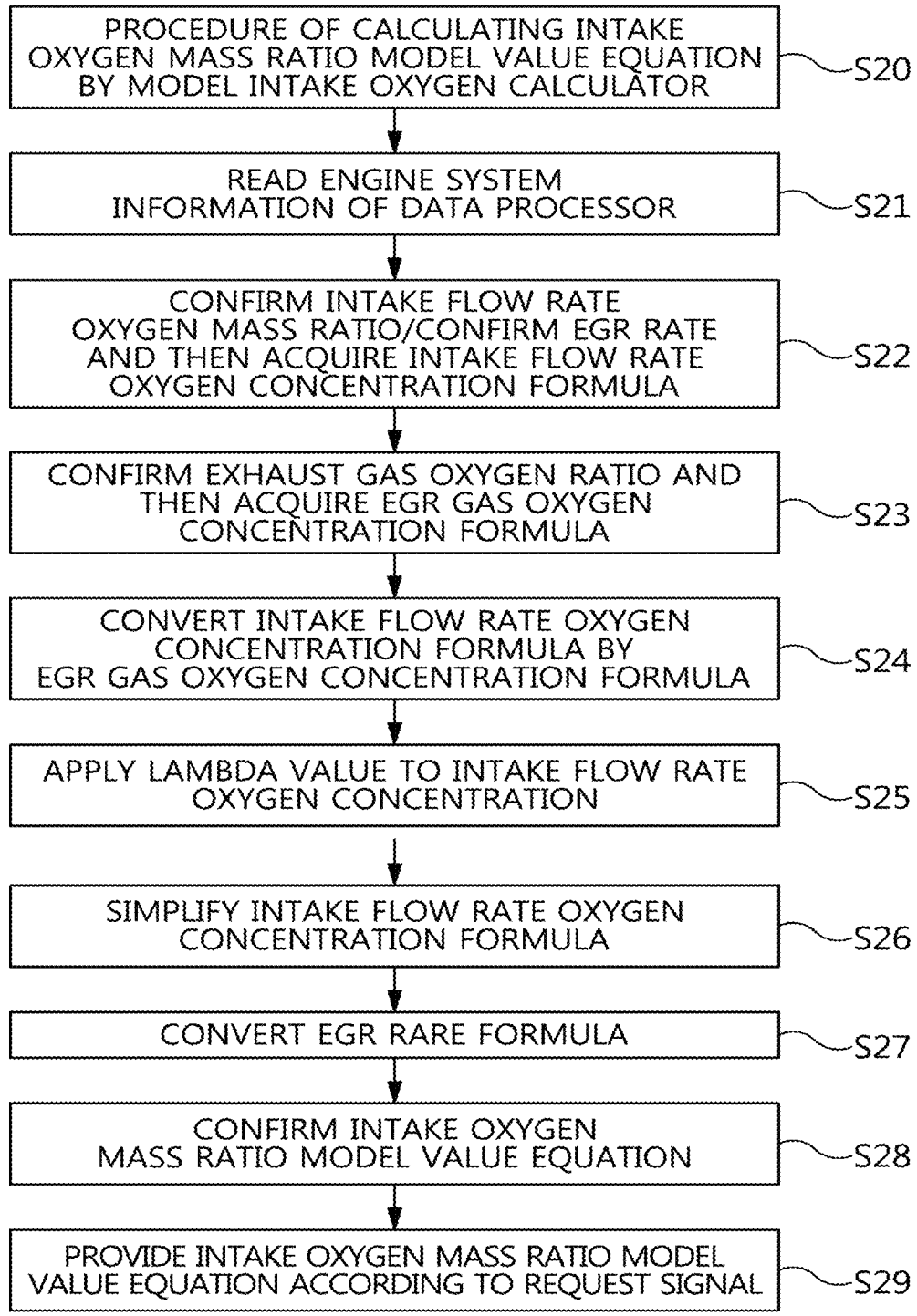
FIG. 6 is a flowchart of the procedure of calculating the model intake oxygen mass ratio.

Meanwhile, FIG. 6 shows a detailed procedure for calculating the intake oxygen mass ratio model value equation (step S20), and this is performed through the model intake oxygen calculator 5 of the intake oxygen concentration model unit 1 of FIG. 5.

Specifically, the calculation procedure of the intake oxygen mass ratio model value equation (step S20) performed by the model intake oxygen calculator 5 is as follows.

First, the model intake oxygen calculator 5 reads the engine information from the data processor 3 as in step S21. In this case, the read engine information includes the intake flow rate oxygen mass ratio, the EGR rate, the exhaust gas oxygen ratio, the fresh air mass flow rate, the EGR gas mass flow rate, the fuel mass flow rate, the exhaust lambda value, the engine displacement, etc. However, the engine information can use all of the engine information provided by the controller 10.

Then, the model intake oxygen calculator 5 confirms the intake oxygen mass ratio model value equation through (steps S22 to S28), and provides the confirmed intake oxygen mass ratio model value equation at the request of the model intake oxygen verifier 6.

For example, steps S22 to S29 are composed of acquiring an intake flow rate oxygen concentration formula (step S22), acquiring an EGR gas oxygen concentration formula (step S23), converting the intake flow rate oxygen concentration formula (step S24), applying a lambda value to the intake flow rate oxygen concentration (step S25), simplifying the intake flow rate oxygen concentration formula (step S26), converting an EGR rate formula (step S27), confirming an intake oxygen mass ratio model value formula (step S28), and providing the intake oxygen mass ratio model value formula according to a request signal (step S29).

The equation for the above is as follows. The assumptions applied to the prediction of the engine intake manifold oxygen concentration (ratio) that operates in the lean combustion EGR condition for the equation are as follows.

Assumptions: (1) The oxygen concentration ratio is constant (mass conservation law) without spatial distribution for simplifying the calculation procedure. (2) The oxygen concentration in the intake manifold gas is calculated by the oxygen flow rate ratio from the sum the fresh air amount and the EGR gas, which are the total gas flow and the oxygen is calculated by the oxygen ratio in the air and the oxygen ratio in the EGR gas. (3) The oxygen concentration ratio in the EGR is considered to be equal to the oxygen concentration in the exhaust gas by the exhaust gas recirculation, and therefore, can use the oxygen concentration in the exhaust flow rate. (4) The oxygen concentration in the exhaust gas is the oxygen ratio in the total exhaust flow rate, and the total exhaust flow rate is the total flow rate of the intake flow rate and the fuel injection amount according to the mass conservation law. (5) For the oxygen concentration used in the combustion, since the amount of fuel injected under the lean combustion condition all reacts with the air, the oxygen mass flow rate in the exhaust gas is the sum of the oxygen remaining after using the intake air oxygen for the combustion and the oxygen contained in the EGR gas (i.e., the oxygen mass ratio in the exhaust flow rate=the oxygen remaining after being consumed in the engine in the fresh air+the oxygen in the EGR). (6) In the procedure of recirculating the exhaust gas after combustion, oxygen is not involved in the chemical reaction, the oxygen concentration in the exhaust gas and the oxygen concentration in the EGR gas are not largely changed, and the oxygen concentration ratio in the exhaust gas and the oxygen concentration ration in the EGR gas are the same. (7) The EGR rate is an EGR gas rate in the intake gas and is calculated by the total flow rate and the fresh air gas flow rate.

In addition, $m_{air}$, $m_{fuel}$, $M_{egr}$, $MF_{o,int}$, $MF_{o,egr}$, $MF_{o,air}$, $\lambda_o$, $\lambda$, $V_d$, N, P, $Vol_{eff}$, $m_{total}$, and $MF_{flow\ meter}$ are applied as variables, and these are defined as follows. The $m_{air}$: fresh air mass flow rate, $m_{fuel}$: fuel mass flow rate, $M_{egr}$: EGR mass flow rate, $MF_{o,int}$: oxygen ratio in the intake manifold, $MF_{o,egr}$: oxygen ratio in the EGR, $MF_{o,air}$: oxygen ratio in the air, $\lambda_o$: theoretical air-to-fuel ratio (=14.5), $\lambda$: exhaust gas lambda sensor value, $V_d$: engine displacement, N: engine RPM, P: intake manifold pressure, $Vol_{eff}$: filling efficiency, $m_{total}$: total intake gas mass flow rate, and $MF_{flow\ meter}$: air amount sensor mass flow rate.

In the acquiring the intake flow rate oxygen concentration formula S22, Equation 1 representing the oxygen mass ratio in the intake flow rate is calculated.

$$MF_{o,int} = \frac{m_{o,int}}{m_{total\ int}} = \frac{MF_{o,air} \cdot m_{air} + MF_{o,egr} \cdot m_{egr}}{m_{air} + m_{egr}} \quad \text{Equation 1}$$

In the acquiring the EGR gas oxygen concentration formula S23, Equation 2 representing the oxygen ratio in the exhaust gas is calculated.

$$MF_{o,exh} = \frac{\left(m_{air} + m_{fuel}\left(\frac{m_{air}}{m_{fuel}}\right)^{theoretical}_{ratio}\right) MF_{o,air} + m_{egr}MF_{o,egr}}{m_{air} + m_{egr} + m_{fuel}} = MF_{o,egr} \quad \text{Equation 2}$$

For this purpose, Equation 2-1 representing the EGR gas flow rate in the intake flow rate is applied.

$$EGR = \frac{m_{egr}}{m_{air} + m_{egr}} \quad \text{Equation 2-1}$$

In the converting the intake flow rate oxygen concentration S24, Equation 3 representing the oxygen concentration in the intake air by the EGR rate, the oxygen ratio in the air, and the oxygen ratio in the EGR is calculated.

$$MF_{o,int} = (1-EGR) \cdot MF_{o,air} + EGR \cdot MF_{o,egr} \quad \text{Equation 3}$$

In the applying the lambda value to the intake flow rate oxygen concentration S25, Equation 4 representing the theoretical air-to-fuel ratio and Equation 5 representing the lambda value of the lambda sensor are applied.

$$\left(\frac{m_{air}}{m_{fuel}}\right)^{theoretical}_{ratio} = \lambda_o \quad \text{Equation 4}$$

$$\lambda = \frac{m_{air}}{m_{fuel}\lambda_o} \quad \text{Equation 5}$$

In the simplifying the intake flow rate oxygen concentration formula S26, Equation 6A or Equation 6B representing the intake oxygen concentration as the EGR and the lambda value is calculated.

$$MF_{o,int} = MF_{o,air}\left(1 - EGR\frac{1 + \frac{1}{\lambda_o}}{\lambda + \frac{1}{\lambda_o}}\right) \quad \text{Equation 6A}$$

When the Equation 6B ($1/\lambda_o$ (1/14.5=0.068) is significantly smaller than 1)

$$MF_{o,int} = MF_{o,air}\left(1 - EGR \cdot \frac{1}{\lambda}\right)$$

For this purpose, Equation 6-1 representing the exhaust gas oxygen concentration obtained by the oxygen concentration in the air and the lambda value, and Equation 6-2 specifically expressing the oxygen concentration in the intake flow rate are applied.

$$MF_{o,egr} = \frac{MF_{o,air}(\lambda - 1)}{\lambda + 1/\lambda_o} \quad \text{Equation 6-1}$$

$$MF_{o,int} = (1 - EGR) \cdot MF_{o,air} + EGR \cdot MF_{o,egr} \quad \text{Equation 6-2}$$

In the converting the EGR rate S27, Equation 7 representing the filling efficiency, the total flow rate obtained by the intake manifold pressure and temperature, and the fresh air gas flow rate to which the air amount sensor value is applied is calculated.

$$EGR = \frac{m_{egr}}{m_{air} + m_{egr}} = \frac{m_{total} - m_{air}}{m_{total}} \quad \text{Equation 7}$$

$$m_{total} = m_{air} + m_{egr} = \frac{v_d \cdot N}{120\ RT} \cdot P \cdot Vol_{eff}$$

In the confirming the intake oxygen mass ratio model value formula S28, Equation 8 representing the intake oxygen mass ratio model value is confirmed.

$$MF_{o,int} =$$ Equation 8
$$MF_{o,air}\left(1 - EGR \cdot \frac{1}{\lambda}\right) = MF_{o,air}\left(1 - \frac{1}{\lambda}\left[\frac{m_{total} - m_{air}}{m_{total}}\right]\right) =$$
$$MF_{o,air}\left(1 - \frac{1}{\lambda}\left[\frac{m_{total} - m_{flow\,meter}}{m_{total}}\right]\right)$$

As described above, the oxygen mass ratio model value formula of the Equation 8 represents that the intake manifold oxygen concentration ratio can be acquired as a simple and more reliable intake manifold oxygen concentration value through the exhaust-side lambda sensor values and the filling efficiency value, which have been conventionally applied, even while utilizing the total flow rate of the intake manifold. In addition, the intake oxygen mass ratio model value formula is used in the model intake oxygen calculator 5 and the model intake oxygen verifier 6 in the request signal (step S29).

Meanwhile, although it has been described in the order of the Equations 1, 2, 2-1, 3, 4, 5, 6A, 6B, 6-1, 6-2, 7, 8 in order to calculate the intake oxygen mass ratio model value formula, it should be understood that this order or procedure is one changeable example as necessary.

Referring back to FIGS. 1 and 2, thereafter, the controller 10 enters the model application mode (steps S60 to S90). The model application modes (steps S60 to S90) are performed by determining an EGR flow rate compensation control (step S60) that are accompanied by an update procedure (step S60-1), and outputting a model value (step S70), and controlling an EGR system (step S80), and this continues until the engine system is stopped (step S90).

Specifically, the determining the EGR flow rate compensation control (step S60) is performed in the controller 10 for monitoring the combustion situation among the engine information continuously acquired. Therefore, the controller 10 switches to the update procedure S60-1 when the condition of the engine system 100 does not require the EGR flow rate compensation control, while it enters the outputting the model value (step S70) if necessary.

The update procedure (step S60-1) feedbacks to the calculating the model intake oxygen mass ratio (step S20-2) to update by providing the [model intake oxygen mass ratio] $_{compensation}$ value to the model intake oxygen calculator 5 of the intake oxygen concentration model unit 1, such that each step of the model compensation mode (steps S20 to S50) is continuously performed until the engine system is stopped (step S90).

The outputting the model value (step S70) outputs the [model intake oxygen mass ratio] compensation value to the EGR system 130 in the controller 10.

In the controlling the EGR system (step S80), the opening of the EGR valve of the EGR system 130 is controlled by the [model intake oxygen mass ratio] $_{compensation}$ value, thereby adjusting the EGR gas flow rate mixed with the fresh air through the EGR valve. Therefore, the intake air supplied to the combustion chamber 111 of the engine system 100 is kept at the oxygen concentration in the optimum state through the optimized EGR gas flow rate, thereby suppressing the generation of the NOx more effectively in the lean combustion, which should reduce the NOx generated in the combustion process through the EGR due to the exhaust gas reduction limit by the 3-way catalyst.

Figure 7:
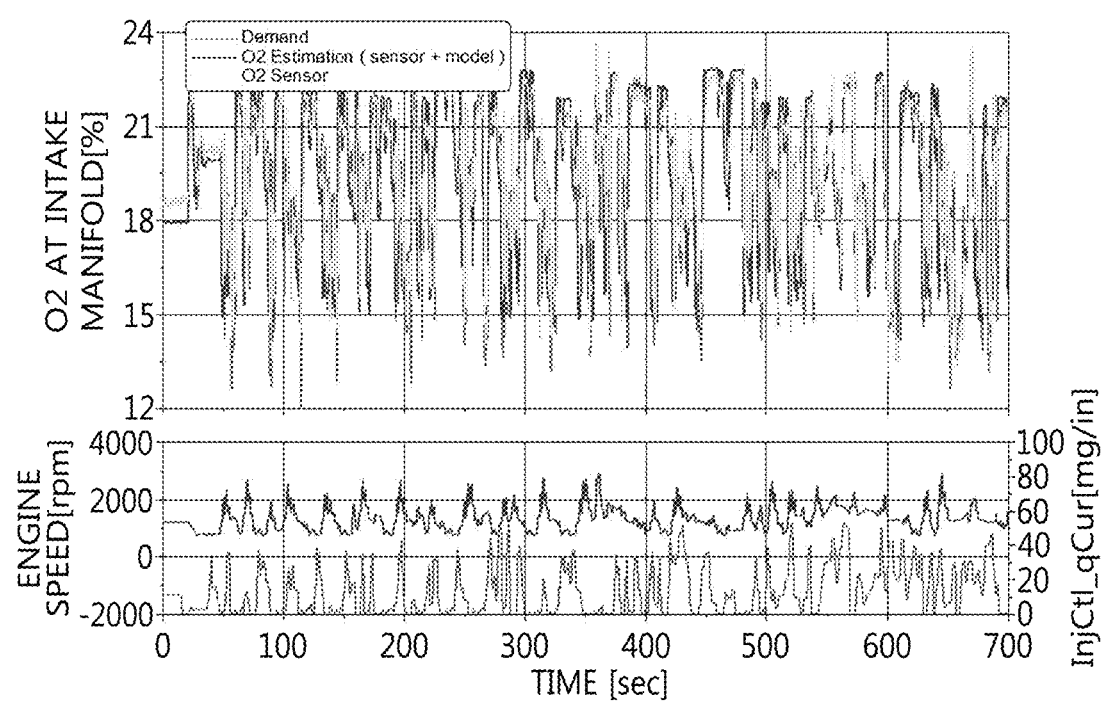
FIG. 7 is a diagram showing an example of comparing the effect of the oxygen concentration-based EGR flow rate compensation control according to the present disclosure with the line diagram of the intake manifold oxygen mass ratio.

Meanwhile, the intake manifold oxygen mass ratio line diagram of FIG. 7 shows the result having applied the experimental conditions where an oxygen sensor is added to the intake side for the test for the direct oxygen concentration measurement of the oxygen sensor, the intake manifold oxygen concentration control target is set as the demand, the calculation of oxygen concentration (O2 estimation) uses the intake oxygen concentration value by the exhaust lambda sensor and the model (formula including the filling efficiency) of the intake oxygen concentration model unit 1.

Therefore, the line diagram of the intake manifold oxygen mass ratio shows the result of testing the applicability by comparing the intake manifold oxygen mass ratio with the external sensor in the high acceleration/deceleration condition of the vehicle, and it is apparent that the EGR flow rate compensation control has calculated the intake manifold oxygen concentration in a manner very similar to the result of using a separate oxygen sensor.

As described above, the oxygen concentration-based EGR flow rate compensation control method applied to the engine system 100 according to the present embodiment calculates the compensation error (K) relative to the indirect intake oxygen mass ratio through the compensation of the model intake oxygen mass ratio calculated by a combination of the intake oxygen mass ratio model value equation and the model exhaust lambda value relative to the indirect intake oxygen mass ratio calculated by a combination of the intake oxygen mass ratio model value equation and the exhaust-side measurement lambda value, and converts the model intake oxygen mass ratio into the [model intake oxygen mass ratio] compensation value with the compensation error (K) by the controller 10 that has confirmed the engine information acquired from the engine system 100, thereby assuring its accuracy.

Therefore, the engine system 100 can reduce the NOx generated in the combustion process of the engine without directly using the intake manifold of the oxygen sensor (or the lambda sensor), and particularly, it is possible to improve the NOx reduction effect for meeting the enhanced exhaust gas and environmental regulations without various technical difficulties such as solving the intake manifold mounting conditions by not using the oxygen sensor (or lambda sensor) in the intake manifold.

What is claimed is:

1. An oxygen concentration-based exhaust gas recirculation (EGR) flow rate compensation control method, comprising:
    performing, by a controller, a model compensation mode, comprising:
    confirming engine information acquired from an engine system;
    calculating an intake oxygen concentration by a model intake oxygen mass ratio through a combination of an intake oxygen mass ratio model value and a model exhaust lambda value and an indirect intake oxygen mass ratio through a combination of the intake oxygen mass ratio model value and an exhaust-side measurement lambda value, respectively; and
    compensating the model intake oxygen mass ratio as a model intake oxygen mass ratio compensation value applying a compensation error relative to the indirect intake oxygen mass ratio by using the model intake oxygen mass ratio as a model intake oxygen mass ratio current value.

2. The oxygen concentration-based EGR flow rate compensation control method of claim 1, wherein the model intake oxygen mass ratio is calculated by applying a fresh air amount, a fresh air temperature, an intake air pressure, an engine RPM, and filling efficiency among the engine information to an intake oxygen concentration model.

3. The oxygen concentration-based EGR flow rate compensation control method of claim 1, wherein the model compensation mode is performed by calculating the intake oxygen concentration that calculates the indirect intake oxygen mass ratio and the model intake oxygen mass ratio, respectively, verifying the model intake oxygen mass ratio that calculates the compensation error by the error verification for the model intake oxygen mass ratio $_{current}$ value, and compensating the model intake oxygen mass ratio that applies the compensation error to the model intake oxygen mass ratio current value to be generated as the model intake oxygen mass ratio compensation value.

4. The oxygen concentration-based EGR flow rate compensation control method of claim 3, wherein calculating the intake oxygen concentration, verifying the model intake oxygen mass ratio, and compensating the model intake oxygen mass ratio are performed through an intake oxygen concentration model unit connected with the controller.

5. The oxygen concentration-based EGR flow rate compensation control method of claim 3, wherein the error verification is calculated by a momentary error rate of the model intake oxygen mass ratio with respect to the indirect intake oxygen mass ratio, and the compensation error is calculated by the momentary error rate.

6. The oxygen concentration-based EGR flow rate compensation control method of claim 5, wherein the momentary error rate is calculated by a time differential for a difference value between the intake oxygen mass ratio and the model intake oxygen mass ratio.

7. The oxygen concentration-based EGR flow rate compensation control method of claim 5, wherein the compensation error is calculated by applying an error learning adjustment speed factor to a momentary error rate integral value that time-integrates the momentary error rate.

8. The oxygen concentration-based EGR flow rate compensation control method of claim 7, wherein the error learning adjustment speed factor is multiplied by the momentary error rate integral value.

9. The oxygen concentration-based EGR flow rate compensation control method of claim 3, wherein the model intake oxygen mass ratio compensation value is calculated by summing the compensation error and the model intake oxygen mass ratio current value.

10. The oxygen concentration-based EGR flow rate compensation control method of claim 1, wherein the model intake oxygen mass ratio is calculated from an intake manifold oxygen concentration applying an intake flow rate oxygen mass ratio, an EGR rate, an intake flow rate oxygen concentration, an exhaust gas oxygen ratio, a theoretical air-to-fuel ratio, a lambda value, an EGR gas oxygen concentration, and an intake flow rate oxygen concentration.

11. The oxygen concentration-based EGR flow rate compensation control method of claim 1, wherein the model application mode controlling the EGR system by the controller is performed by the model intake oxygen mass ratio compensation value.

12. The oxygen concentration-based EGR flow rate compensation control method of claim 11, wherein the model application mode is performed by determining whether to carry out an EGR flow rate compensation control, outputting the model intake oxygen mass ratio compensation value to the EGR system, and performing the compensation control of the EGR flow rate mixed with a fresh air through the EGR system.

13. The oxygen concentration-based EGR flow rate compensation control method of claim 12, wherein when the EGR flow rate compensation control is not carried out, the model intake oxygen mass ratio compensation value is provided for updating the intake oxygen concentration model unit connected with the controller.

14. An engine system, comprising:
a controller configured to control an intake oxygen concentration based on engine information acquired by operating an engine by applying an indirect intake oxygen mass ratio calculated by a combination of an intake oxygen mass ratio model value and an exhaust-side measurement lambda value to a model intake oxygen mass ratio calculated by a combination of the intake oxygen mass ratio model value and a model exhaust lambda value, and outputting by compensating the model intake oxygen mass ratio as a model intake oxygen mass ratio compensation value applying a compensation error relative to the indirect intake oxygen mass ratio; and
an exhaust gas recirculation (EGR) system configured to use the model intake oxygen mass ratio compensation value for an EGR valve opening control for an EGR flow rate compensation control of an EGR gas flow rate comprised in the intake air supplied to a combustion chamber of the engine.

15. The engine system of claim 14, wherein the controller is connected with an intake oxygen concentration model unit for calculating the model intake oxygen mass ratio and the model intake oxygen mass ratio compensation value.

16. The engine system of claim 15, wherein the intake oxygen concentration model unit calculates the model intake oxygen mass ratio by using the engine information received from the controller.

17. The engine system of claim 16, wherein the intake oxygen concentration model unit comprises a data processor for reading the engine information, a model intake oxygen processor for calculating a value of the model intake oxygen mass ratio with the model intake oxygen mass ratio compensation value, and a control value output processor for outputting the model intake oxygen mass ratio compensation value to the controller.

18. The engine system of claim 16, wherein the model intake oxygen processor comprises a model intake oxygen calculator for calculating a momentary error rate for the value of the model intake oxygen mass ratio with the value of the indirect intake oxygen mass ratio, a model intake oxygen verifier for calculating the compensation error by using the momentary error rate, and a model intake oxygen compensator for calculating the model intake oxygen mass ratio compensation value with the compensation error.

19. The engine system of claim 14, wherein the controller is connected with an intake air amount variation model unit for calculating the indirect intake oxygen mass ratio.

* * * * *